(12) United States Patent
Yamamoto

(10) Patent No.: US 11,376,910 B1
(45) Date of Patent: Jul. 5, 2022

(54) SUSPENSION STRUCTURE OF UTILITY VEHICLE

(71) Applicant: KAWASAKI JUKOGYO KABUSHIKI KAISHA, Hyogo (JP)

(72) Inventor: Shunsuke Yamamoto, Kakogawa (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 17/199,614

(22) Filed: Mar. 12, 2021

(51) Int. Cl.
*B60G 3/20* (2006.01)

(52) U.S. Cl.
CPC ........ *B60G 3/202* (2013.01); *B60G 2200/144* (2013.01); *B60G 2300/07* (2013.01)

(58) Field of Classification Search
CPC .............. B60G 3/202; B60G 2200/144; B60G 2300/07; B60G 3/18; B60G 3/20; B60G 2200/156
See application file for complete search history.

(56) References Cited

U.S. PATENT DOCUMENTS

| | | | | |
|---|---|---|---|---|
| 5,560,638 | A * | 10/1996 | Lee ........................ | B60G 3/202 280/124.143 |
| 7,661,689 | B2 | 2/2010 | Kinugasa | |
| 2003/0006573 | A1* | 1/2003 | Seki ......................... | B60G 3/20 280/124.135 |
| 2003/0107201 | A1* | 6/2003 | Chun ..................... | B60G 7/005 280/124.135 |
| 2005/0046136 | A1 | 3/2005 | Sutton | |
| 2005/0167179 | A1* | 8/2005 | Hasegawa ................. | B60G 3/20 180/348 |
| 2007/0170682 | A1* | 7/2007 | Kinugasa .................. | B60G 3/20 280/124.135 |
| 2012/0018973 | A1* | 1/2012 | Fujii ........................ | B60G 3/20 280/124.134 |
| 2013/0049318 | A1* | 2/2013 | Kwon ...................... | B60G 3/20 280/124.139 |
| 2017/0368898 | A1* | 12/2017 | White ....................... | B60G 3/20 |
| 2021/0031580 | A1* | 2/2021 | Booth ...................... | B60G 3/26 |
| 2021/0070354 | A1* | 3/2021 | Eaton ...................... | B60G 7/001 |
| 2021/0276388 | A1* | 9/2021 | Ishibashi ............ | B60G 17/0164 |

FOREIGN PATENT DOCUMENTS

JP 2008183941 A * 8/2008

* cited by examiner

*Primary Examiner* — James A English
*Assistant Examiner* — Scott F. Underwood
(74) *Attorney, Agent, or Firm* — Wenderoth, Lind & Ponack, L.L.P.

(57) ABSTRACT

A suspension structure of a utility vehicle includes: an upper arm including a front shaft support portion supported at front with respect to a vehicle body frame and a rear shaft support portion supported at rear with respect to the vehicle body frame; and a lower arm located below the upper arm and including a front shaft support portion supported at front with respect to the vehicle body frame and a rear shaft support portion supported at rear with respect to the vehicle body frame. In a top view of the utility vehicle, the front shaft support portion of the upper arm is located behind a mechanism side connecting portion, which is coupled to a final speed reduction mechanism, of an axle shaft for coupling the final speed reduction mechanism and a rear wheel.

12 Claims, 10 Drawing Sheets

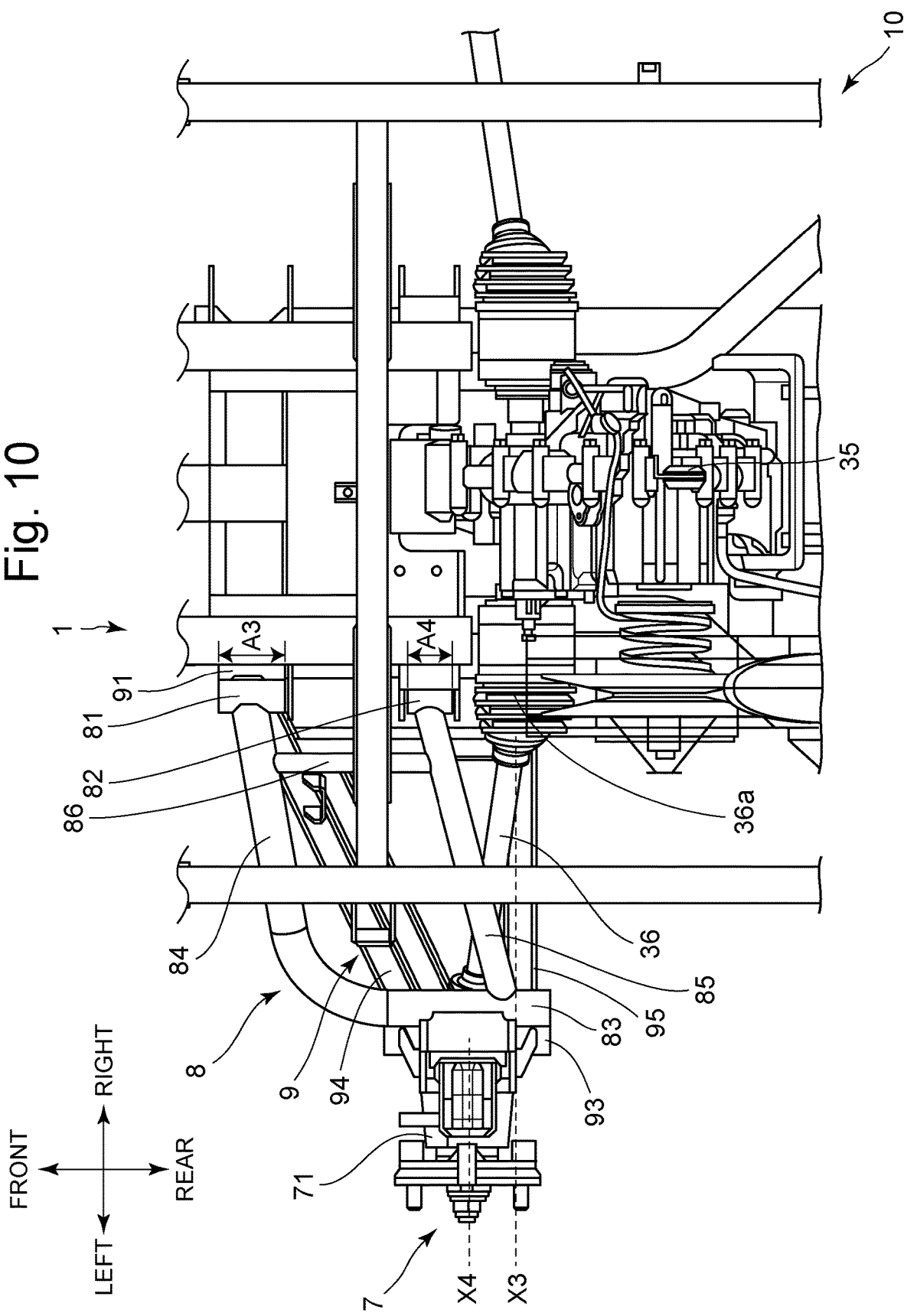

SUSPENSION STRUCTURE OF UTILITY VEHICLE

BACKGROUND OF THE INVENTION

1. Field of the Invention

The present invention relates to a suspension structure of a utility vehicle.

2. Description of the Related Art

Conventionally, as described in US 2005/0046136 A1, when a double wishbone type is applied to a suspension structure of a utility vehicle, suspension arms are mounted on upper and lower sides, and an axle shaft coupling a final speed reduction mechanism of the utility vehicle and a vehicle wheel is arranged between the upper and lower suspension arms.

SUMMARY OF THE INVENTION

However, in considering making spatial arrangement in a vehicle body more compact, it is conceivable that the suspension arm and the axle shaft interfere with each other in the above arrangement.

Therefore, an object of the present invention is to provide a suspension structure of a utility vehicle that can prevent interference between a suspension arm and an axle shaft.

In order to achieve the above object, according to a first aspect of the present invention, there is provided a suspension structure of a utility vehicle, including:

an upper arm including two shaft support portions, the shaft support portions being supported at front and rear with respect to a vehicle body frame; and a lower arm located below the upper arm and including two shaft support portions, the shaft support portions being supported at front and rear with respect to the vehicle body frame, in which, in a top view of the utility vehicle, a front shaft support portion of the upper arm with respect to the vehicle body frame is located behind a mechanism side connecting portion, which is coupled to a final speed reduction mechanism, of an axle shaft coupling the final speed reduction mechanism of the utility vehicle and a rear wheel.

According to the above configuration, by locating the front shaft support portion of the upper arm behind the mechanism side connecting portion of the axle shaft, interference between the front shaft support portion and the mechanism side connecting portion can be prevented. Further, the mechanism side connecting portion can be located in front of the front shaft support portion, and the length of the final speed reduction mechanism in the front-rear direction can be reduced as compared to the case where the mechanism side connecting portion is located behind the front shaft support portion.

According to a second aspect of the present invention, there is provided a suspension structure of a utility vehicle, including:

an upper arm including two shaft support portions, the shaft support portions being supported at front and rear with respect to a vehicle body frame; and a lower arm located below the upper arm and including two shaft support portions, the shaft support portions being supported at front and rear with respect to the vehicle body frame, in which, in a top view of the utility vehicle, a rear shaft support portion of the upper arm with respect to the vehicle body frame is located in front of a mechanism side connecting portion, which is coupled to a final speed reduction mechanism, of an axle shaft coupling the final speed reduction mechanism of the utility vehicle and a front wheel.

According to the above configuration, by locating the rear shaft support portion of the upper arm in front of the mechanism side connecting portion of the axle shaft, interference between the rear shaft support portion and the mechanism side connecting portion can be prevented. Further, the mechanism side connecting portion can be located behind the rear shaft support portion, and the length of the final speed reduction mechanism in the front-rear direction can be reduced as compared to the case where the mechanism side connecting portion is located in front of the rear shaft support portion.

According to a third aspect of the present invention, there is provided a suspension structure of a utility vehicle, including:

an upper arm including two shaft support portions, the shaft support portions being supported at front and rear with respect to a vehicle body frame; and a lower arm located below the upper arm and including two shaft support portions, the shaft support portions being supported at front and rear with respect to the vehicle body frame, in which, in a top view of the utility vehicle, a front shaft support portion of the upper arm and a front shaft support portion of the lower arm overlap each other, a rear shaft support portion of the upper arm and a rear shaft support portion of the lower arm are arranged so as to be displaced from each other, and an axle shaft coupling a final speed reduction mechanism of the utility vehicle and a vehicle wheel overlaps an arm portion connected to the rear shaft support portion of the lower arm, or the rear shaft support portion of the upper arm and the rear shaft support portion of the lower arm overlap each other, the front shaft support portion of the upper arm and the front shaft support portion of the lower arm are arranged so as to be displaced from each other, and the axle shaft coupling the final speed reduction mechanism of the utility vehicle and the vehicle wheel overlaps an arm portion connected to the front shaft support portion of the lower arm.

According to the above configuration, the length of the final speed reduction mechanism in the front-rear direction can be reduced while preventing the interference between the front or rear shaft support portion of the upper arm and the mechanism side connecting portion.

In short, according to the present invention, it is possible to provide the suspension structure of a utility vehicle that can prevent the interference between the suspension arm and the axle shaft.

BRIEF DESCRIPTION OF THE DRAWINGS

FIG. 10 is a partial top view of the utility vehicle, for showing the suspension structure.

DETAILED DESCRIPTION OF THE PREFERRED EMBODIMENTS

Hereinafter, a utility vehicle having a suspension structure according to an embodiment of the present invention will be described with reference to the accompanying drawings. The utility vehicle is mainly a vehicle for traveling not only on grasslands, gravel, and sand, but also on an off road such as unpaved mountain roads, forest roads, muddy areas, and rocky areas. For convenience of explanation, front-rear, left-right, and up-down directions of a driver boarding the utility vehicle will be described as front-rear, left-right, and up-down directions of the utility vehicle and each component.

[Overall Structure of Vehicle]

Figure 1:
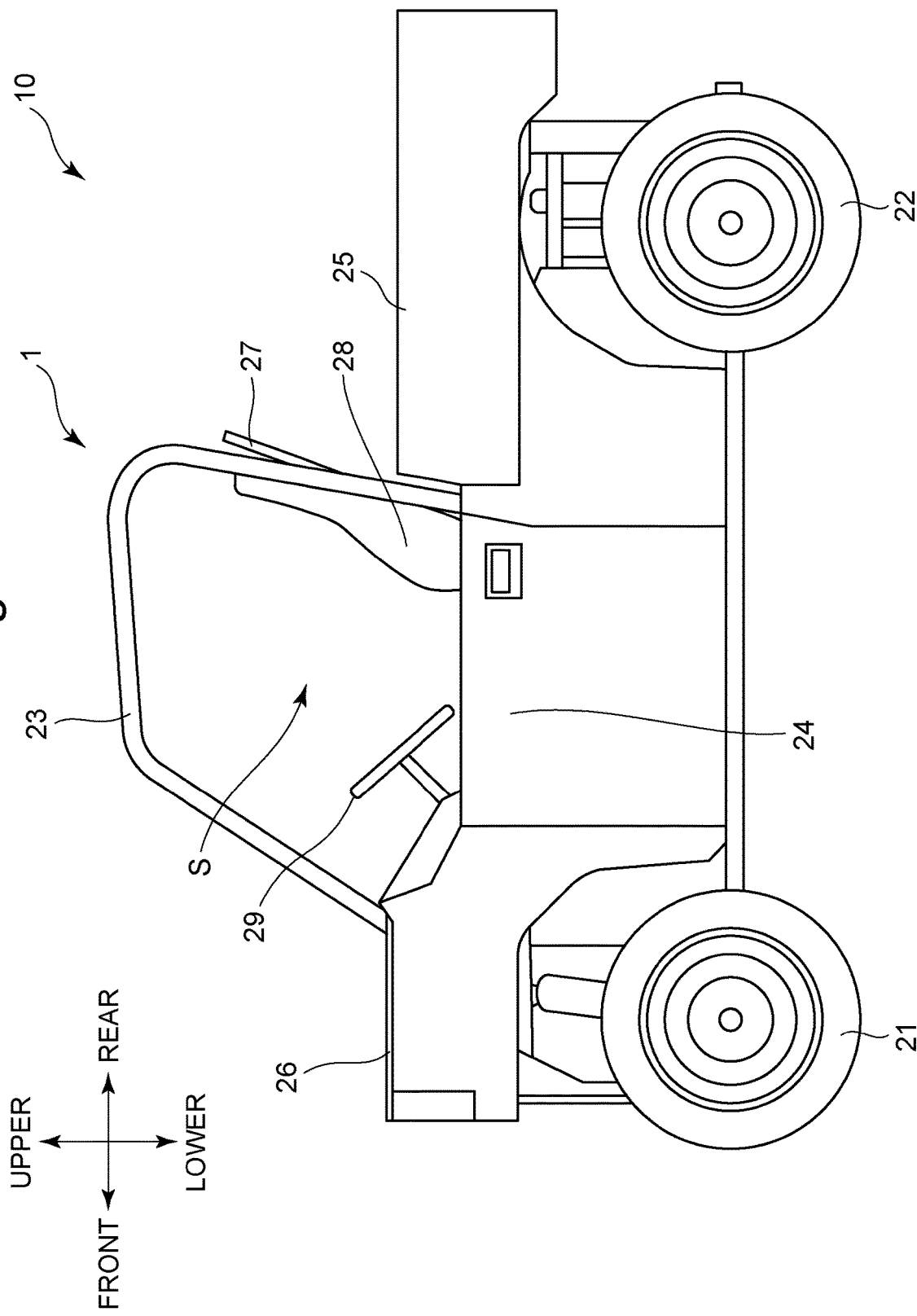
FIG. 1 is a perspective view of a utility vehicle having a suspension structure according to an embodiment of the present invention.

FIG. 1 is a left side view of the utility vehicle having the suspension structure according to the embodiment of the present invention.

As shown in FIG. 1, the utility vehicle 10 includes a pair of left and right front wheels 21 at the front of a vehicle body, and a pair of left and right rear wheels 22 at the rear of the vehicle body, and has a riding space (cabin) S between the front wheels 21 and the rear wheels 22. The riding space S is surrounded by a ROPS 23 and a pair of left and right doors 24. The ROPS is an abbreviation for rollover protective structure and is a part of a vehicle body frame 1.

A cargo bed 25 is provided behind the riding space S, and a bonnet 26 is provided in front of the riding space S. Further, at the front end of the cargo bed 25, a back panel 27 that partitions the cargo bed 25 and the riding space S is provided.

A seat 28 is installed in the riding space S. An operation unit such as a steering wheel 29 is provided in front of the seat 28.

Figure 2:
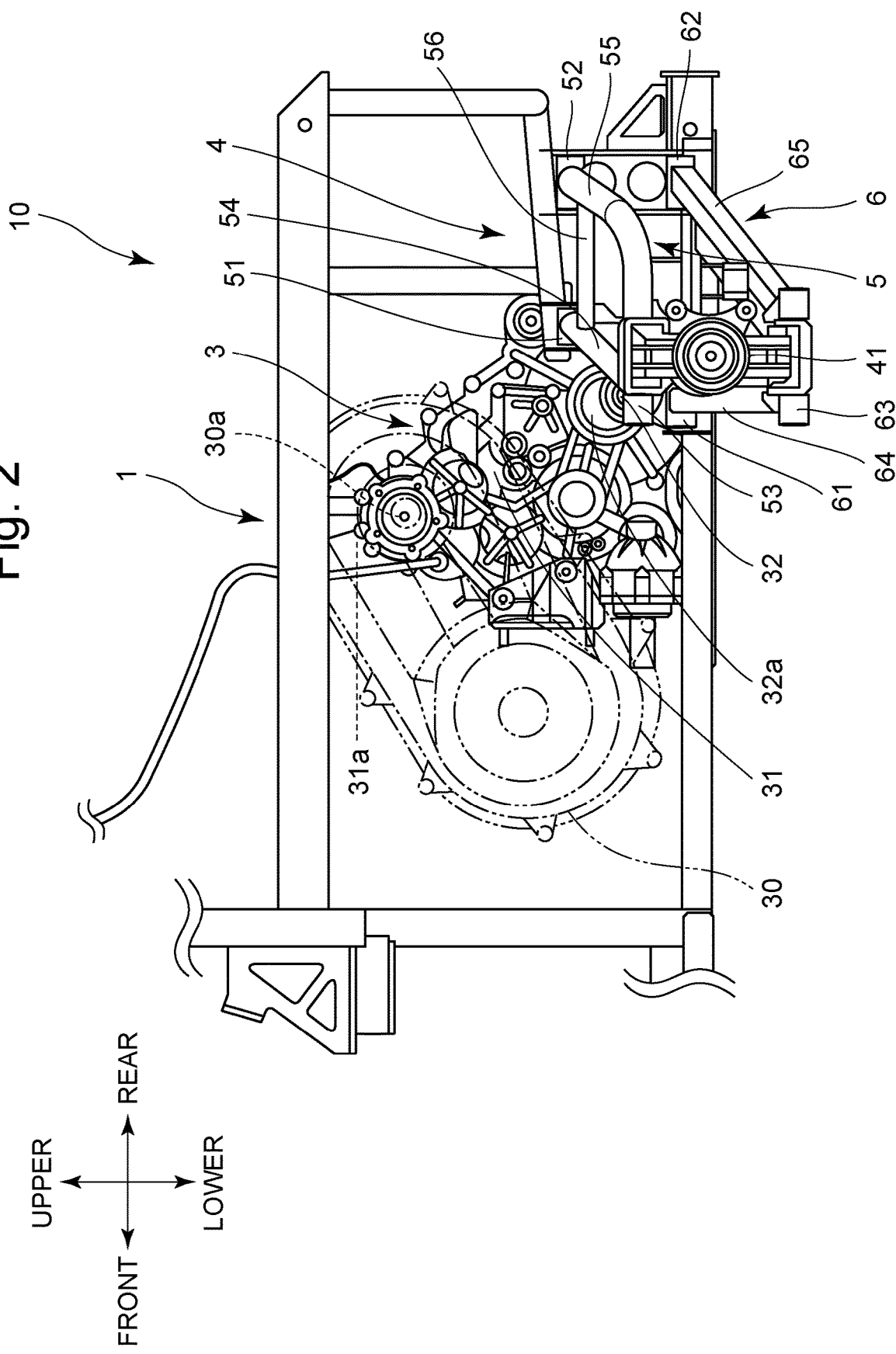
FIG. 2 is a partial side view of the utility vehicle, for showing the suspension structure.

FIG. 2 is a partial side view of the utility vehicle 10, for showing the suspension structure. As shown in FIGS. 1 and 2, a power unit (not shown) is provided below the cargo bed 25. The power unit includes an engine (not shown), a transmission 3 arranged behind the engine, and a V-belt continuously variable transmission (CVT) 30 arranged on the left side of the engine and the transmission 3. The driving force of the engine is transmitted to the transmission 3 via the continuously variable transmission 30, and the transmission 3 transmits the driving force to the pairs of left and right front wheels 21 and rear wheels 22. The above positional relationship between the engine, the transmission 3, and the continuously variable transmission 30 is an example, and the present invention is not limited to this.

More specifically, in the transmission 3, the transmitted driving force of the engine is changed, and after the driving force is finally decelerated in a final speed reduction mechanism 31, the driving force of the final speed reduction mechanism 31 is transmitted to the rear wheels 22 via axle shafts 32 coupling the final speed reduction mechanism 31 and the rear wheel 22. The final speed reduction mechanism 31 is a final speed reducer provided in the final stage of the transmission 3 and arranged on the axle of the rear wheels 22.

[Suspension Device for Rear Wheel]

On both sides of the transmission 3, a pair of left and right double wishbone type suspension devices 4 for rear wheels that swingably support the pair of left and right rear wheels 22 in the up-down direction are arranged. The double wishbone type refers to a structure in which a pair of upper and lower arms that are attached so as to extends nearly horizontally to the road surface from the vehicle body in a vehicle lateral direction sandwich a knuckle portion of the wheel from above and below. The pair of left and right suspension devices 4 have a symmetrical shape and have a similar structure. Therefore, in the following, the suspension device 4 for a left rear wheel will be described as an example, but the configuration of the suspension device 4 for a left rear wheel is similarly applied to the configuration of the suspension device for a right rear wheel.

Figure 3:
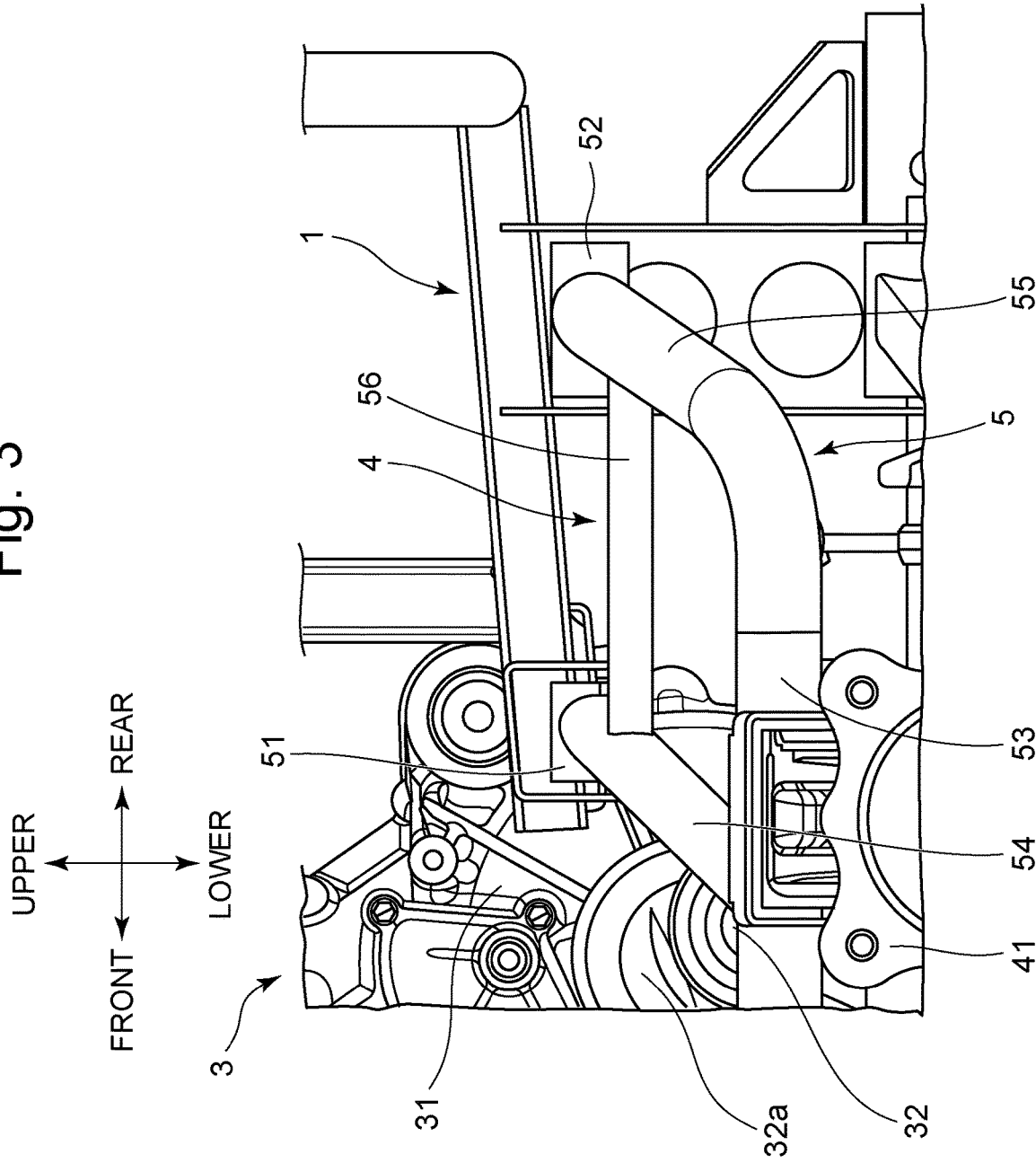
FIG. 3 is a partially enlarged view of FIG. 2.
Figure 4:
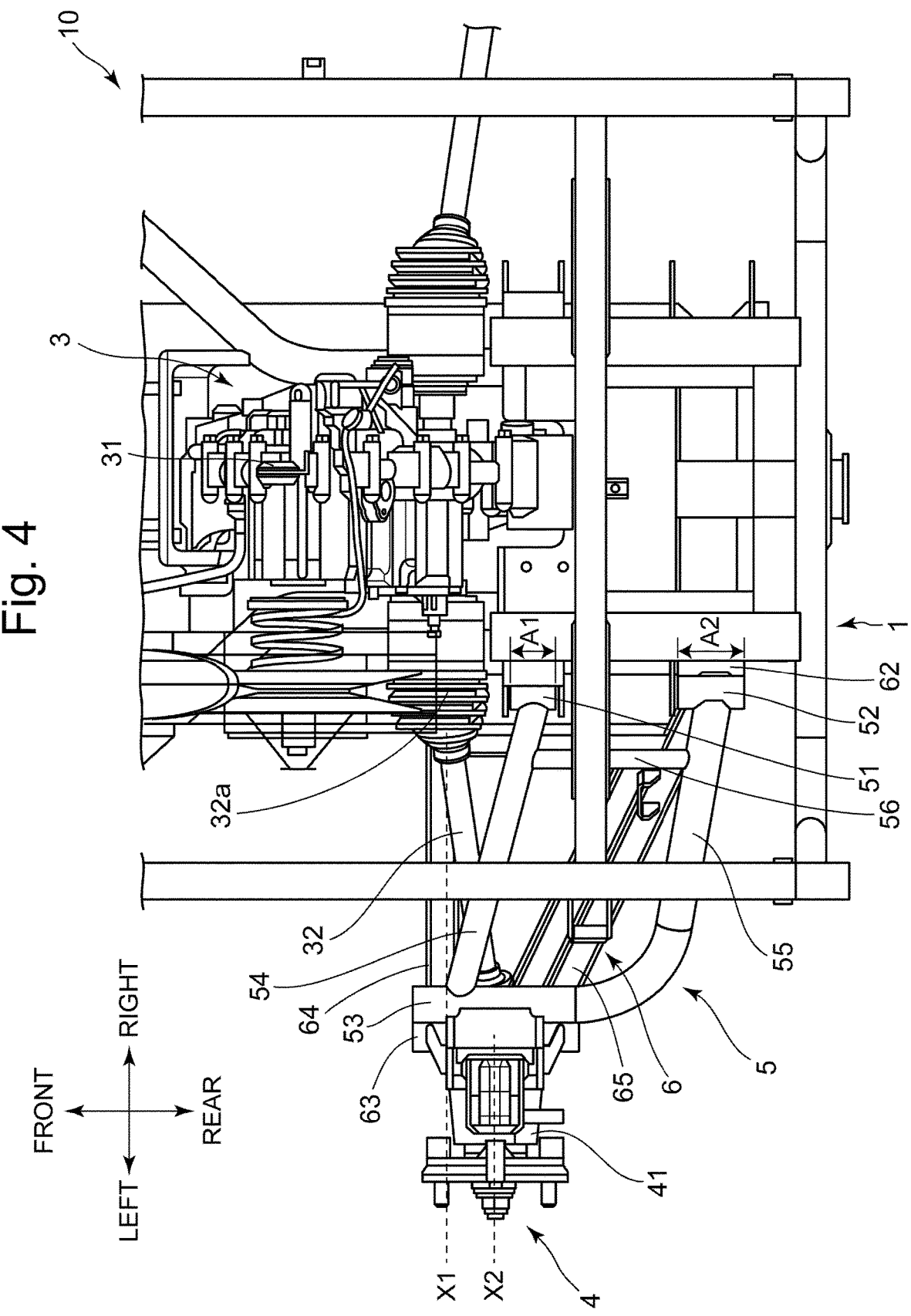
FIG. 4 is a partial top view of the utility vehicle, for showing the suspension structure.
Figure 5:
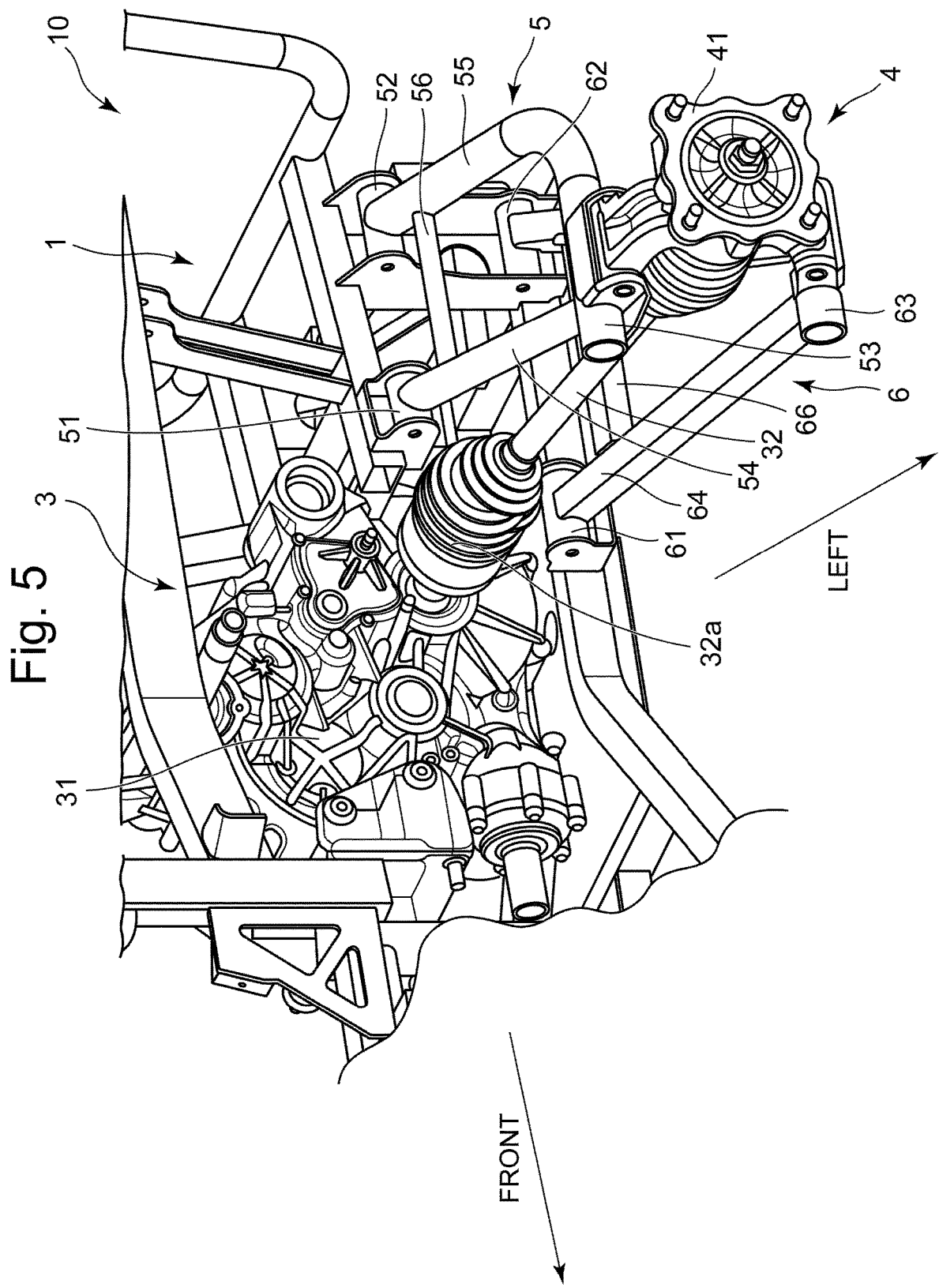
FIG. 5 is a partial front perspective view of the utility vehicle, for showing the suspension structure.
Figure 6:
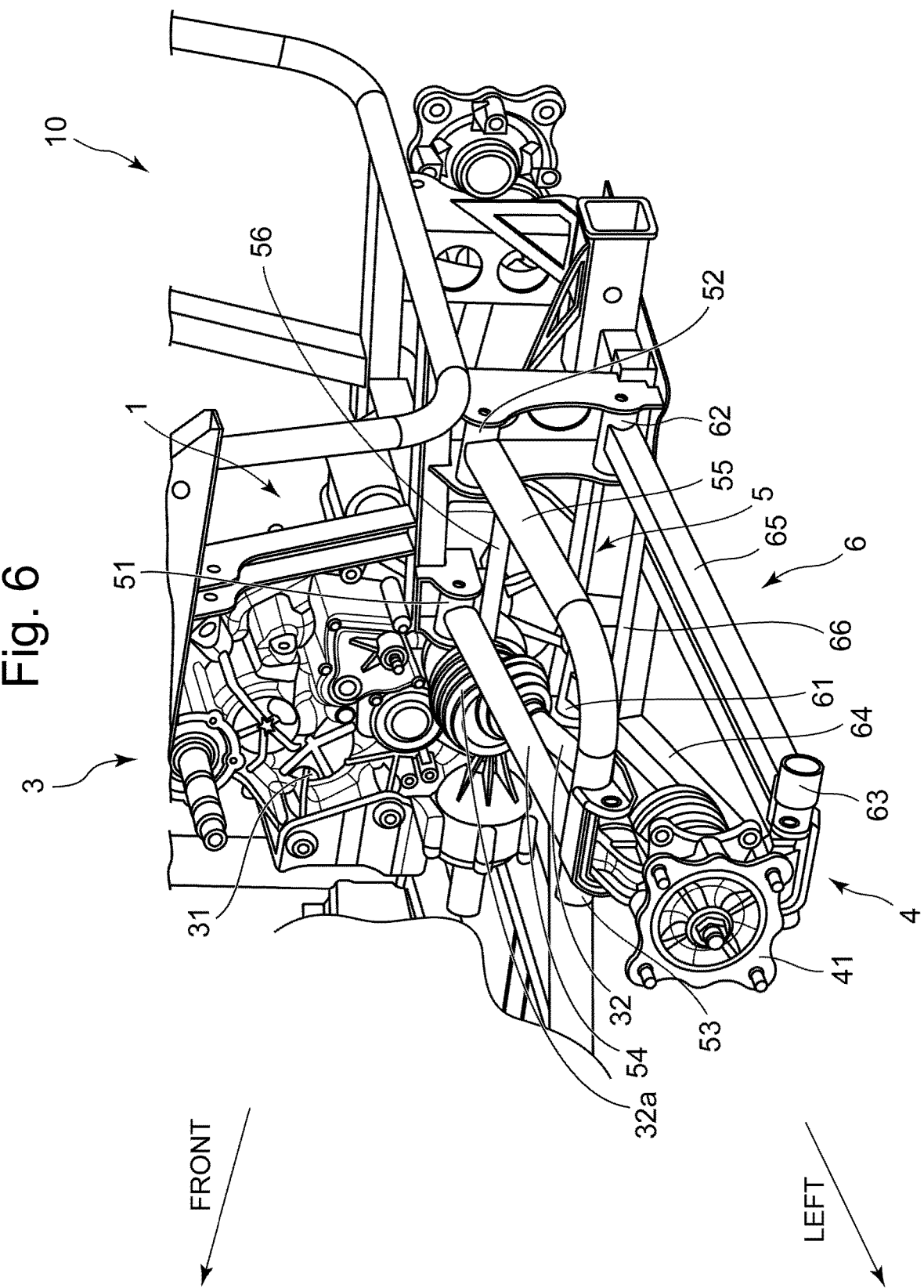
FIG. 6 is a partial rear perspective view of the utility vehicle, for showing the suspension structure.
Figure 7:
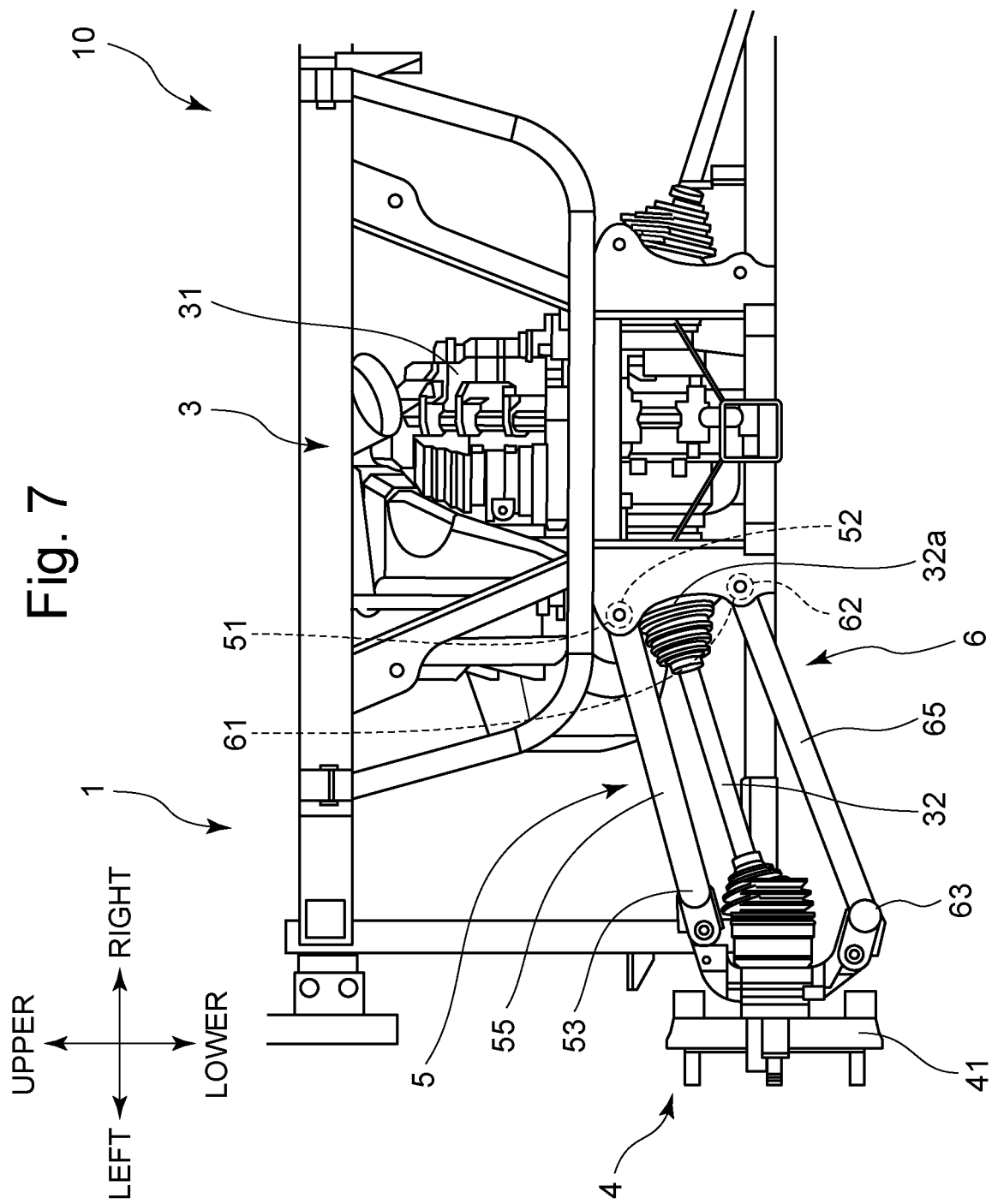
FIG. 7 is a partial rear view of the utility vehicle, for showing the suspension structure.
Figure 8:
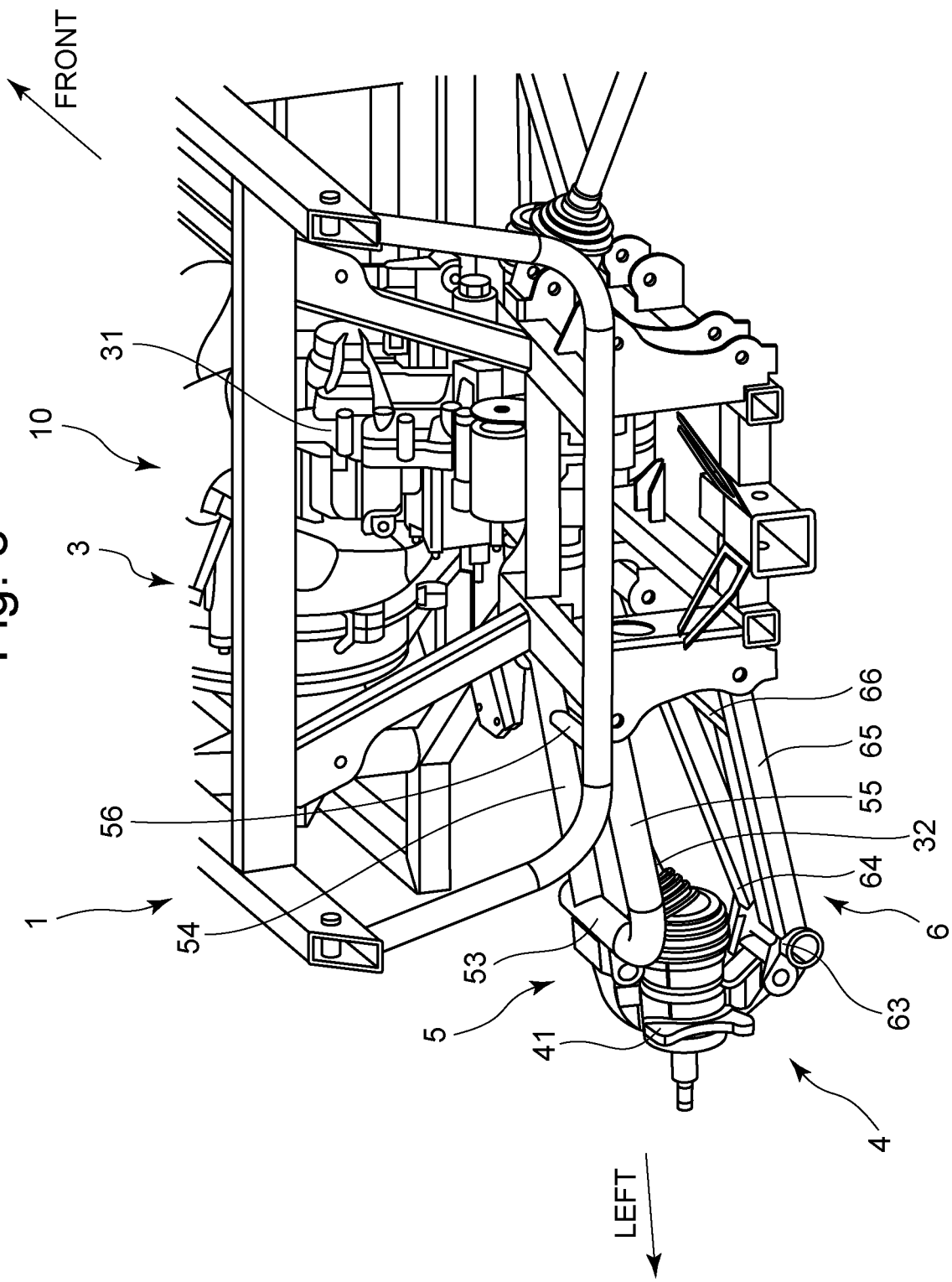
FIG. 8 is a partial rear perspective view of the utility vehicle, for showing the suspension structure.

FIG. 3 is a partially enlarged view of FIG. 2. Further, FIG. 4 is a partial top view of the utility vehicle 10, for showing the suspension structure. FIG. 5 is a partial front perspective view of the utility vehicle 10, for showing the suspension structure, and FIG. 6 is a partial rear perspective view of the same. FIG. 7 is a partial rear view of the utility vehicle 10, for showing the suspension structure, and FIG. 8 is a partial rear perspective view of the same.

As shown in FIGS. 2 to 8, the suspension device 4 includes a knuckle 41 that rotatably supports a hub of the rear wheel 22, an upper arm 5 that extends in the vehicle width direction and supports the knuckle 41 on the vehicle body frame 1, and a lower arm 6 that extends in the vehicle width direction, is located below the upper arm 5, and supports the knuckle 41 on the vehicle body frame 1. Although a shock absorber of the suspension device 4 is connected to a bracket (not shown) of the lower arm 6, it may be connected to the upper arm 5. When the shock absorber of the suspension device 4 is connected to the lower arm 6, the shock absorber extends so as to intersect the upper arm 5 in the up-down direction in the rear view. Therefore, the vertical height of the vehicle body can be suppressed while ensuring a long stroke of the shock absorber.

The upper arm 5 includes two shaft support portions 51 and 52, and the shaft support portions 51 and 52 are supported at the front and rear with respect to the vehicle body frame 1. Further, the upper arm 5 includes an upper knuckle coupling portion 53 extending in the front-rear direction and coupled to the knuckle 41, an upper front arm portion 54 extending from the front shaft support portion 51 in the vehicle width direction and coupled to the upper knuckle coupling portion 53, and an upper rear arm portion 55 extending from the rear shaft support portion 52 in the vehicle width direction and coupled to the upper knuckle coupling portion 53.

The upper front arm portion 54 and the upper rear arm portion 55 are coupled by an upper coupling arm portion 56 extending in the front-rear direction. The upper coupling arm portion 56 is located inward in the vehicle width direction with respect to the upper knuckle coupling portion 53. The upper front arm portion 54, the upper rear arm portion 55, and the upper coupling arm portion 56 each have a circular cross section. However, the cross-sectional shapes of the upper front arm portion 54, the upper rear arm portion 55, and the upper coupling arm portion 56 are examples, and are not limited thereto. Further, the upper front arm portion 54 and the upper rear arm portion 55 extend in parallel, and the upper rear arm portion 55 continuously forms the upper knuckle coupling portion 53 by bend molding. With such a configuration, the number of welded parts can be reduced and the manufacturability can also be improved. The shapes are examples, and are not limited to these.

The lower arm 6 includes two shaft support portions 61 and 62, and the shaft support portions 61 and 62 are supported at the front and rear with respect to the vehicle body frame 1. Further, the lower arm 6 includes a lower knuckle coupling portion 63 extending in the front-rear direction and coupled to the knuckle 41, a lower front arm portion 64 extending from the front shaft support portion 61 in the vehicle width direction and coupled to the lower knuckle coupling portion 63, and a lower rear arm portion 65 extending from the rear shaft support portion 62 in the vehicle width direction and coupled to the lower knuckle coupling portion 63.

The lower front arm portion 64 and the lower rear arm portion 65 are coupled by a lower coupling arm portion 66 extending in the front-rear direction. The lower coupling arm portion 66 is located inward in the vehicle width direction with respect to the lower knuckle coupling portion 63. The lower front arm portion 64, the lower rear arm portion 65, and the lower coupling arm portion 66 each have a rectangular cross section. However, the cross-sectional shapes of the lower front arm portion 64, the lower rear arm portion 65, and the lower coupling arm portion 66 are examples, and are not limited thereto.

In the top view of the utility vehicle 10, the rear shaft support portion 52 of the upper arm 5 and the rear shaft support portion 62 of the lower arm 6 overlap each other, and the front shaft support portion 51 of the upper arm 5 and the front shaft support portion 61 of the lower arm 6 are displaced from each other in the front-rear direction. Specifically, the front shaft support portion 51 of the upper arm 5 is located behind the front shaft support portion 61 of the lower arm 6. The axle shaft 32 coupling the final speed reduction mechanism 31 of the utility vehicle 10 and the rear wheel 22 overlaps the lower front arm portion 64 connected to the front shaft support portion 61 of the lower arm 6 in the same top view.

In the top view of the utility vehicle 10, the front shaft support portion 51 of the upper arm 5 with respect to the vehicle body frame 1 is located behind a mechanism side connecting portion 32a, which is coupled to the final speed reduction mechanism 31, of the axle shaft 32 coupling the final speed reduction mechanism 31 of the utility vehicle 10 and the rear wheel 22. The axle shaft 32 is movable in accordance with the up-down swing of the suspension device 4, and the rotational force is continuously transmitted from the final speed reduction mechanism 31 to the rear wheel 22. In the top view of the utility vehicle 10, the axle shaft 32 extends rearward toward the outside in the vehicle width direction, and a wheel rotation axis X2 of the knuckle 41 is located behind an axial position X1 of the mechanism side connecting portion 32a on the final speed reduction mechanism 31 side of the axle shaft 32. On the other hand, the upper front arm portion 54 extends forward toward the outside in the vehicle width direction. Therefore, in the top view of the utility vehicle 10, the axle shaft 32 and the upper front arm portion 54 intersect each other.

An axial length A1 of the front shaft support portion 51 of the upper arm 5 is smaller than an axial length A2 of the rear shaft support portion 52 of the upper arm 5.

In the top view of the utility vehicle 10, the rear shaft support portion 52 of the upper arm 5 and the rear shaft support portion 62 of the lower arm 6 are located so as to overlap each other, and the axial length of the rear shaft support portion 52 of the upper arm 5 is the same as an axial length of the rear shaft support portion 62 of the lower arm 6.

In the top view of the utility vehicle 10, the upper front arm portion 54 intersects the axle shaft 32 in the vicinity of the knuckle 41, more specifically, on the outside in the vehicle width direction with respect to the intermediate position in the overall length of the upper arm 5 in the vehicle width direction in the top view of the utility vehicle 10.

The front shaft support portion 61 of the lower arm 6 is located in front of the front shaft support portion 51 of the upper arm 5.

In the top view of the utility vehicle 10, the lower arm 6 has an A shape due to the lower knuckle coupling portion 63, the lower front arm portion 64, the lower rear arm portion 65, and the lower coupling arm portion 66, and the front shaft support portion 61 of the lower arm 6 overlaps a part of the axle shaft 32.

In the rear view of the utility vehicle 10, a part of the mechanism side connecting portion 32a overlaps the shaft support portions 51 and 52 of the upper arm 5.

The distance between the front shaft support portion 51 and the rear shaft support portion 52 of the upper arm 5 is smaller than the length of the upper knuckle coupling portion 53 of the upper arm 5 in the front-rear direction.

The shaft support portions 51 and 52 of the upper arm 5 are located below an output shaft 30a of the continuously variable transmission 30 (input shaft of the final speed reduction mechanism 31) and an upper end 31a of the final speed reduction mechanism 31.

According to the suspension structure for a rear wheel having the above configuration, the following effects can be exhibited.

(1) By locating the front shaft support portion 51 of the upper arm 5 behind the mechanism side connecting portion 32a of the axle shaft 32, interference between the front shaft support portion 51 and the mechanism side connecting portion 32a can be prevented. Further, the mechanism side connecting portion 32a can be located in front of the front shaft support portion 51, and the length of the final speed reduction mechanism 31 in the front-rear direction can be reduced as compared to the case where the mechanism side connecting portion 32a is located behind the front shaft support portion 51.

(2) The axial length of the front shaft support portion 51 of the upper arm 5 is smaller than the axial length of the rear shaft support portion 52 of the upper arm 5. Therefore, the interference between the front shaft support portion 51 and the mechanism side connecting portion 32a can be further prevented.

(3) In the top view of the utility vehicle 10, the rear shaft support portion 52 of the upper arm 5 and the rear shaft support portion 62 of the lower arm 6 are located so as to overlap each other, and the axial length of the rear shaft support portion 52 of the upper arm 5 is the same as the axial length of the rear shaft support portion 62 of the lower arm 6. Therefore, the structural balance between the upper arm 5 and the lower arm 6 can be adjusted on the rear side to make the suspension structure compact in the front-rear direction.

(4) In the top view of the utility vehicle 10, the upper front arm portion 54 extending from the front shaft support portion 51 of the upper arm 5 toward the knuckle 41 side intersects the axle shaft 32 in the vicinity of the knuckle 41. Therefore, the mechanism side connecting portion 32a of the axle shaft 32 can be located in front of the front shaft support portion 51 of the upper front arm portion 54 without changing the position of the rear wheel 22.

(5) The front shaft support portion 61 of the lower arm 6 is located in front of the front shaft support portion 51 of the upper arm 5. Therefore, the overall rigidity of the suspension structure can be ensured without an increase in the front-rear direction.

(6) In the top view of the utility vehicle 10, the front shaft support portion 61 of the lower arm 6 overlaps a part of the axle shaft 32. Therefore, the arrangement of the suspension structure in the front-rear direction can be made more compact.

(7) In the rear view of the utility vehicle 10, a part of the mechanism side connecting portion 32a overlaps the shaft support portions 51 and 52 of the upper arm 5. Therefore, the dimension of the suspension structure in the up-down direction can be made compact while preventing the interference between the mechanism side connecting portion 32a and the shaft support portions 51 and 52.

(8) In the top view of the utility vehicle 10, the rear shaft support portion 52 of the upper arm 5 with respect to the vehicle body frame 1 is located behind the mechanism side connecting portion 32a, which is coupled to the final speed reduction mechanism 31, of the axle shaft 32 coupling the final speed reduction mechanism 31 of the utility vehicle 10 and the rear wheel 22. Therefore, the interference between the rear shaft support portion 52 and the mechanism side connecting portion 32a can be prevented. Further, the mechanism side connecting portion 32a can be located in front of the rear shaft support portion 52, and the length of the final speed reduction mechanism 31 in the front-rear direction can be reduced as compared to the case where the mechanism side connecting portion 32a is located behind the rear shaft support portion 52.

(9) In the top view of the utility vehicle 10, the rear shaft support portion 52 of the upper arm 5 and the rear shaft support portion 62 of the lower arm 6 overlap each other, the front shaft support portion 51 of the upper arm 5 and the front shaft support portion 61 of the lower arm 6 are arranged so as to be displaced from each other, and the axle shaft 32 coupling the final speed reduction mechanism 31 of the utility vehicle 10 and the rear wheel 22 overlaps the lower front arm portion 64 connected to the front shaft support portion 61 of the lower arm 6. Therefore, the length of the final speed reduction mechanism 31 in the front-rear direction can be reduced while preventing the interference between the front shaft support portion 51 of the upper arm 5 and the mechanism side connecting portion 32a.

In the above embodiment, the distance between the front shaft support portion 51 and the rear shaft support portion 52 of the upper arm 5 is smaller than the length of the upper knuckle coupling portion 53 of the upper arm 5 in the front-rear direction, but the distance between the front shaft support portion 51 and the rear shaft support portion 52 of the upper arm 5 may be equal to or larger than the length of the upper knuckle coupling portion 53 of the upper arm 5 in the front-rear direction. That is, in the top view of the utility vehicle 10, the upper arm 5 may have a parallelogram shape or a trapezoidal shape narrowing outward in the vehicle width direction.

In the above embodiment, in the top view of the utility vehicle 10, the rear shaft support portion 52 of the upper arm 5 and the rear shaft support portion 62 of the lower arm 6 overlap each other, the front shaft support portion 51 of the upper arm 5 and the front shaft support portion 61 of the lower arm 6 are arranged so as to be displaced from each other, and the axle shaft 32 coupling the final speed reduction mechanism 31 of the utility vehicle 10 and the rear wheel 22 overlaps the lower front arm portion 64 connected to the front shaft support portion 61 of the lower arm 6. However, in the top view of the utility vehicle 10, the front shaft support portion 51 of the upper arm 5 and the front shaft support portion 61 of the lower arm 6 may overlap each other, the rear shaft support portion 52 of the upper arm 5 and the rear shaft support portion 62 of the lower arm 6 may be arranged so as to be displaced from each other, and the axle shaft 32 coupling the final speed reduction mechanism 31 of the utility vehicle 10 and the rear wheel 22 may overlap the lower rear arm portion 65 connected to the rear shaft support portion 62 of the lower arm 6.

[Suspension Device for Front Wheel]

Figure 9:
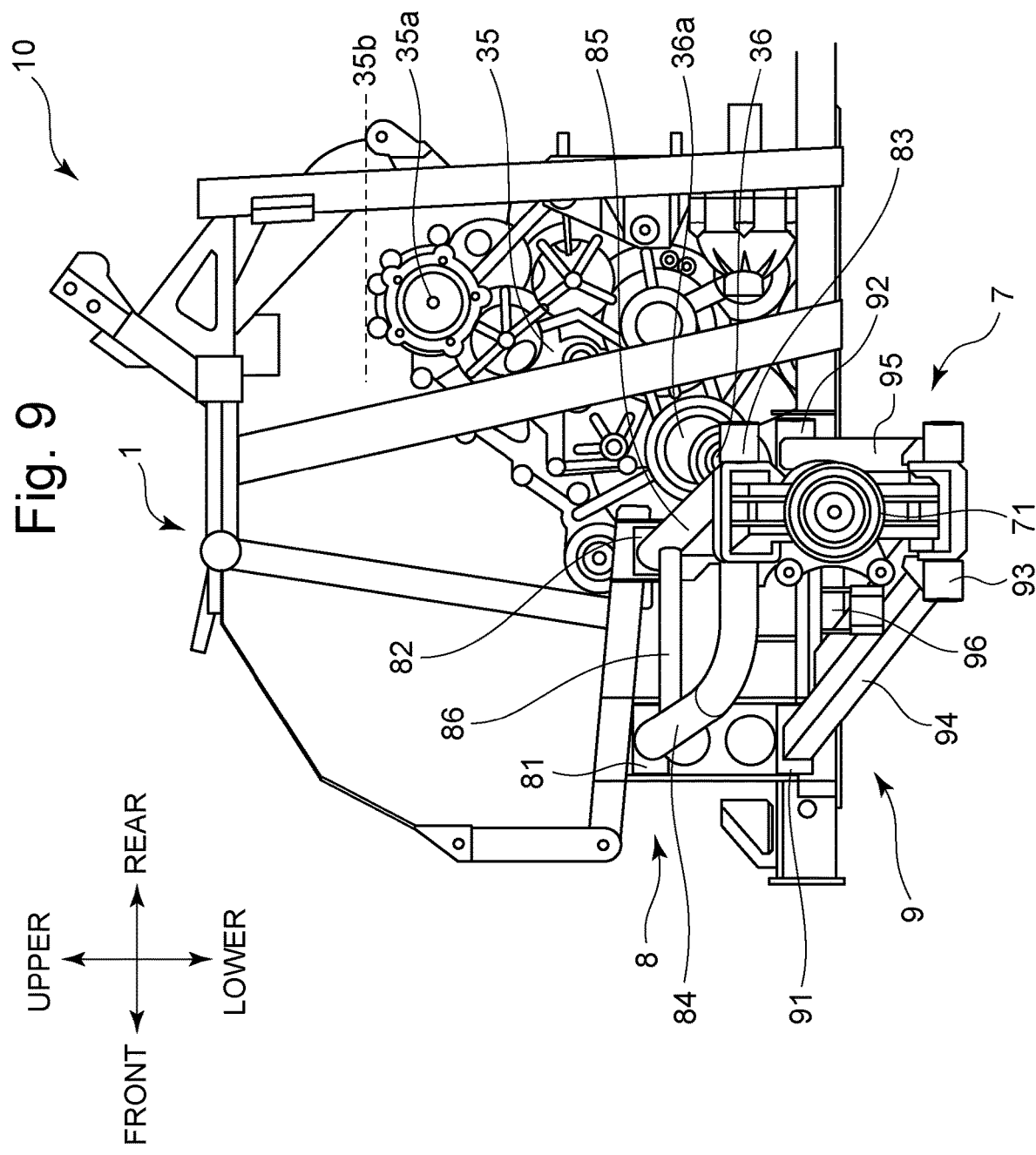
FIG. 9 is a partial side view of the utility vehicle, for showing a suspension structure.

The suspension structure for a rear wheel described above may be applied to a suspension structure for a front wheel. FIG. 9 is a partial side view of the utility vehicle 10, for showing the suspension structure for a front wheel, and FIG. 10 is a partial top view of the utility vehicle 10, for showing the suspension structure for a front wheel. As shown in FIGS. 9 and 10, suspension devices 7 for front wheels are a pair of left and right double wishbone type suspension devices similarly to the suspension devices 4 for rear wheels, and the pair of left and right suspension devices have a symmetrical shape and have a similar structure. Therefore, in the following, the suspension device 7 for a left front wheel will be described as an example, but the configuration of the suspension device 7 for a left front wheel is similarly applied to the configuration of the suspension device for a right front wheel.

The suspension device 7 for a front wheel has a structure that is line-symmetric with the suspension device 4 for a rear wheel with respect to the front-rear direction center line that passes through the center of the utility vehicle 10 in the front-rear direction and extends in the vehicle width direction.

The suspension device 7 includes a knuckle 71 that rotatably supports a hub of the front wheel 21, an upper arm 8 that extends in the vehicle width direction and supports the knuckle 71 on the vehicle body frame 1, and a lower arm 9 that extends in the vehicle width direction, is located below the upper arm 8, and supports the knuckle 71 on the vehicle body frame 1.

The upper arm 8 includes two shaft support portions 81 and 82, and the shaft support portions 81 and 82 are supported at the front and rear with respect to the vehicle body frame 1. Further, the upper arm 8 includes an upper knuckle coupling portion 83 extending in the front-rear direction and coupled to the knuckle 71, an upper front arm portion 84 extending from the front shaft support portion 81 in the vehicle width direction and coupled to the upper knuckle coupling portion 83, and an upper rear arm portion 85 extending from the rear shaft support portion 82 in the vehicle width direction and coupled to the upper knuckle coupling portion 83.

The upper front arm portion 84 and the upper rear arm portion 85 are coupled by an upper coupling arm portion 86 extending in the front-rear direction. The upper coupling arm portion 86 is located inward in the vehicle width direction with respect to the upper knuckle coupling portion 83. The upper front arm portion 84, the upper rear arm portion 85, and the upper coupling arm portion 86 each have a circular cross section. However, the cross-sectional shapes of the upper front arm portion 84, the upper rear arm portion 85, and the upper coupling arm portion 86 are examples, and are not limited thereto. Further, the upper front arm portion 84 and the upper rear arm portion 85 extend in parallel, and the upper rear arm portion 85 continuously forms the upper knuckle coupling portion 83 by bend molding. With such a configuration, the number of welded parts can be reduced and the manufacturability can also be improved. The shapes are examples, and are not limited to these.

The lower arm 9 includes two shaft support portions 91 and 92, and the shaft support portions 91 and 92 are supported at the front and rear with respect to the vehicle body frame 1. Further, the lower arm 9 includes a lower knuckle coupling portion 93 extending in the front-rear direction and coupled to the knuckle 71, a lower front arm portion 94 extending from the front shaft support portion 91 in the vehicle width direction and coupled to the lower knuckle coupling portion 93, and a lower rear arm portion 95 extending from the rear shaft support portion 92 in the vehicle width direction and coupled to the lower knuckle coupling portion 93.

The lower front arm portion 94 and the lower rear arm portion 95 are coupled by a lower coupling arm portion 96 extending in the front-rear direction. The lower coupling arm portion 96 is located inward in the vehicle width direction with respect to the lower knuckle coupling portion 93. The lower front arm portion 94, the lower rear arm portion 95, and the lower coupling arm portion 96 each have a rectangular cross section. However, the cross-sectional shapes of the lower front arm portion 94, the lower rear arm portion 95, and the lower coupling arm portion 96 are examples, and are not limited thereto.

In the top view of the utility vehicle 10, the front shaft support portion 81 of the upper arm 8 and the front shaft support portion 91 of the lower arm 9 overlap each other, and the rear shaft support portion 82 of the upper arm 8 and the rear shaft support portion 92 of the lower arm 9 are displaced from each other, specifically, the rear shaft support portion 82 is located in front of the rear shaft support portion 92. An axle shaft 36 coupling a final speed reduction mechanism 35 of the utility vehicle 10 and the front wheel 21 overlaps the lower rear arm portion 95 connected to the rear shaft support portion 92 of the lower arm 9. The final speed reduction mechanism 35 is a final speed reducer provided in the final stage of the transmission 3 and arranged on the axle of the front wheels 21.

In the top view of the utility vehicle 10, the rear shaft support portion 82 of the upper arm 8 with respect to the vehicle body frame 1 is located in front of a mechanism side connecting portion 36a, which is coupled to the final speed reduction mechanism 35, of the axle shaft 36 coupling the final speed reduction mechanism 35 of the utility vehicle 10 and the front wheel 21. The axle shaft 36 is movable in accordance with the up-down swing of the suspension device 7, and the rotational force is continuously transmitted from the final speed reduction mechanism 35 to the front wheel 21. In the top view of the utility vehicle 10, the axle shaft 36 extends forward toward the outside in the vehicle width direction, and a wheel rotation axis X4 of the knuckle 71 is located in front of an axial position X3 of the mechanism side connecting portion 36a on the final speed reduction mechanism 35 side of the axle shaft 36. On the other hand, the upper rear arm portion 85 extends rearward toward the outside in the vehicle width direction. Therefore, in the top view of the utility vehicle 10, the axle shaft 36 and the upper rear arm portion 85 intersect each other.

An axial length A4 of the rear shaft support portion 82 of the upper arm 8 is smaller than an axial length A3 of the front shaft support portion 81 of the upper arm 8.

In the top view of the utility vehicle 10, the front shaft support portion 81 of the upper arm 8 and the front shaft support portion 91 of the lower arm 9 are located so as to overlap each other, and the axial length of the front shaft support portion 81 of the upper arm 8 is the same as an axial length of the front shaft support portion 91 of the lower arm 9.

In the top view of the utility vehicle 10, the upper rear arm portion 85 intersects the axle shaft 36 in the vicinity of the knuckle 71, more specifically, on the outside in the vehicle width direction with respect to the intermediate position in the overall length of the upper arm 8 in the vehicle width direction in the top view of the utility vehicle 10.

The rear shaft support portion 92 of the lower arm 9 is located behind the rear shaft support portion 82 of the upper arm 8.

In the top view of the utility vehicle 10, the lower arm 9 has an A shape due to the lower knuckle coupling portion 93, the lower front arm portion 94, the lower rear arm portion 95, and the lower coupling arm portion 96, and the rear shaft support portion 92 of the lower arm 9 overlaps a part of the axle shaft 36.

In the front view of the utility vehicle 10, a part of the mechanism side connecting portion 36a overlaps the shaft support portions 81 and 82 of the upper arm 8.

The distance between the front shaft support portion 81 and the rear shaft support portion 82 of the upper arm 8 is smaller than the length of the upper knuckle coupling portion 83 of the upper arm 8 in the front-rear direction.

The shaft support portions 81 and 82 of the upper arm 8 are located below an input shaft 35a and an upper end 35b of the final speed reduction mechanism 35.

According to the suspension structure for a front wheel having the above configuration, the following effects can be exhibited.

(1) By locating the rear shaft support portion 82 of the upper arm 8 in front of the mechanism side connecting portion 36a of the axle shaft 36, interference between the rear shaft support portion 82 and the mechanism side connecting portion 36a can be prevented. Further, the mechanism side connecting portion 36a can be located behind the rear shaft support portion 82, and the length of the final speed reduction mechanism 35 in the front-rear direction can be reduced as compared to the case where the mechanism side connecting portion 36a is located in front of the rear shaft support portion 82.

(2) The axial length of the rear shaft support portion 82 of the upper arm 8 is smaller than the axial length of the front shaft support portion 81 of the upper arm 8. Therefore, the interference between the rear shaft support portion 82 and the mechanism side connecting portion 36a can be further prevented.

(3) In the top view of the utility vehicle 10, the front shaft support portion 81 of the upper arm 8 and the front shaft support portion 91 of the lower arm 9 are located so as to overlap each other, and the axial length of the front shaft support portion 81 of the upper arm 8 is the same as the axial length of the front shaft support portion 91 of the lower arm 9. Therefore, the structural balance between the upper arm 8 and the lower arm 9 can be adjusted on the front side to make the suspension structure compact in the front-rear direction.

(4) In the top view of the utility vehicle 10, the upper rear arm portion 85 extending from the rear shaft support portion 82 of the upper arm 8 toward the knuckle 71 side intersects the axle shaft 36 in the vicinity of the knuckle 71. Therefore, the mechanism side connecting portion 36a of the axle shaft 36 can be located behind the rear shaft support portion 82 of the upper rear arm portion 85 without changing the position of the front wheel 21.

(5) The rear shaft support portion 92 of the lower arm 9 is located behind the rear shaft support portion 82 of the upper arm 8. Therefore, the overall rigidity of the suspension structure can be ensured without an increase in the front-rear direction.

(6) In the top view of the utility vehicle 10, the rear shaft support portion 92 of the lower arm 9 overlaps a part of the axle shaft 36. Therefore, the arrangement of the suspension structure in the front-rear direction can be made more compact.

(7) In the front view of the utility vehicle 10, a part of the mechanism side connecting portion 36*a* overlaps the shaft support portions 81 and 82 of the upper arm 8. Therefore, the dimension of the suspension structure in the up-down direction can be made compact while preventing the interference between the mechanism side connecting portion 36*a* and the shaft support portions 81 and 82.

(8) In the top view of the utility vehicle 10, the rear shaft support portion 82 of the upper arm 8 with respect to the vehicle body frame 1 is located in front of the mechanism side connecting portion 36*a*, which is coupled to the final speed reduction mechanism 35, of the axle shaft 36 coupling the final speed reduction mechanism 35 of the utility vehicle 10 and the front wheel 21. Therefore, the interference between the rear shaft support portion 82 and the mechanism side connecting portion 36*a* can be prevented. Further, the mechanism side connecting portion 36*a* can be located behind the rear shaft support portion 82, and the length of the final speed reduction mechanism in the front-rear direction can be reduced as compared to the case where the mechanism side connecting portion 36*a* is located in front of the rear shaft support portion 82.

(9) In the top view of the utility vehicle 10, the front shaft support portion 81 of the upper arm 8 and the front shaft support portion 91 of the lower arm 9 overlap each other, the rear shaft support portion 82 of the upper arm 8 and the rear shaft support portion 92 of the lower arm 9 are arranged so as to be displaced from each other, and the axle shaft 36 coupling the final speed reduction mechanism 35 of the utility vehicle 10 and the front wheel 21 overlaps the lower rear arm portion 95 connected to the rear shaft support portion 92 of the lower arm 9. Therefore, the length of the final speed reduction mechanism 35 in the front-rear direction can be reduced while preventing the interference between the rear shaft support portion 82 of the upper arm 8 and the mechanism side connecting portion 36*a*.

In the above embodiment, the distance between the front shaft support portion 81 and the rear shaft support portion 82 of the upper arm 8 is smaller than the length of the upper knuckle coupling portion 83 of the upper arm 8 in the front-rear direction, but the distance between the front shaft support portion 81 and the rear shaft support portion 82 of the upper arm 8 may be equal to or larger than the length of the upper knuckle coupling portion 83 of the upper arm 8 in the front-rear direction. That is, in the top view of the utility vehicle 10, the upper arm 8 may have a parallelogram shape or a trapezoidal shape narrowing outward in the vehicle width direction.

In the above embodiment, in the top view of the utility vehicle 10, the front shaft support portion 81 of the upper arm 8 and the front shaft support portion 91 of the lower arm 9 overlap each other, the rear shaft support portion 82 of the upper arm 8 and the rear shaft support portion 92 of the lower arm 9 are arranged so as to be displaced from each other, and the axle shaft 36 coupling the final speed reduction mechanism 35 of the utility vehicle 10 and the front wheel 21 overlaps the lower rear arm portion 95 connected to the rear shaft support portion 92 of the lower arm 9. However, in the top view of the utility vehicle 10, the rear shaft support portion 82 of the upper arm 8 and the rear shaft support portion 92 of the lower arm 9 may overlap each other, the front shaft support portion 81 of the upper arm 8 and the front shaft support portion 91 of the lower arm 9 may be arranged so as to be displaced from each other, and the axle shaft 36 coupling the final speed reduction mechanism 35 of the utility vehicle 10 and the front wheel 21 may overlap the lower front arm portion 94 connected to the front shaft support portion 91 of the lower arm 9.

Various modifications and changes may also be made without departing from the spirit and scope of the present invention described in the claims.

What is claimed is:

1. A suspension structure of a utility vehicle, the suspension structure comprising:
   an upper arm including a front shaft support portion supported at front with respect to a vehicle body frame and a rear shaft support portion supported at rear with respect to the vehicle body frame; and
   a lower arm located below the upper arm and including a front shaft support portion supported at front with respect to the vehicle body frame and a rear shaft support portion supported at rear with respect to the vehicle body frame,
   wherein:
   in a top view of the utility vehicle, the front shaft support portion of the upper arm is located behind a mechanism side connecting portion, which is coupled to a final speed reduction mechanism, of an axle shaft for coupling the final speed reduction mechanism and a rear wheel; and
   in a rear view of the utility vehicle, a part of the mechanism side connecting portion overlaps the front shaft support portion of the upper arm and the rear shaft support portion of the upper arm.

2. The suspension structure according to claim 1, wherein an axial length of the front shaft support portion of the upper arm is smaller than an axial length of the rear shaft support portion of the upper arm.

3. The suspension structure according to claim 1, wherein:
   in the top view of the utility vehicle, the rear shaft support portion of the upper arm and the rear shaft support portion of the lower arm overlap each other; and
   an axial length of the rear shaft support portion of the upper arm is the same as an axial length of the rear shaft support portion of the lower arm.

4. The suspension structure according to claim 1, wherein, in the top view of the utility vehicle, an upper front arm portion extending from the front shaft support portion of the upper arm toward a knuckle side intersects the axle shaft.

5. The suspension structure according to claim 4, wherein, in the top view of the utility vehicle, the upper front arm portion intersects the axle shaft adjacent to a knuckle.

6. The suspension structure according to claim 1, wherein the front shaft support portion of the lower arm is located in front of the front shaft support portion of the upper arm.

7. The suspension structure according to claim 6, wherein, in the top view of the utility vehicle, the front shaft support portion of the lower arm overlaps a part of the axle shaft.

8. The suspension structure according to claim 1, wherein the front shaft support portion of the upper arm and the rear shaft support portion of the upper arm are located below an upper end of the final speed reduction mechanism.

9. A suspension structure of a utility vehicle, the suspension structure comprising:
- an upper arm including a front shaft support portion supported at front with respect to a vehicle body frame and a rear shaft support portion supported at rear with respect to the vehicle body frame; and
- a lower arm located below the upper arm and including a front shaft support portion supported at front with respect to the vehicle body frame and a rear shaft support portion supported at rear with respect to the vehicle body frame, wherein:
- in a top view of the utility vehicle, the rear shaft support portion of the upper arm is located in front of a mechanism side connecting portion, which is coupled to a final speed reduction mechanism, of an axle shaft for coupling the final speed reduction mechanism and a front wheel; and
- in a front view of the utility vehicle, a part of the mechanism side connecting portion overlaps the front shaft support portion of the upper arm and the rear shaft support portion of the upper arm.

10. A suspension structure of a utility vehicle, the suspension structure comprising:
- an upper arm including a front shaft support portion supported at front with respect to a vehicle body frame and a rear shaft support portion supported at rear with respect to the vehicle body frame; and
- a lower arm located below the upper arm and including a front shaft support portion supported at front with respect to the vehicle body frame and a rear shaft support portion supported at rear with respect to the vehicle body frame, wherein:
- in a top view of the utility vehicle, the front shaft support portion of the upper arm and the front shaft support portion of the lower arm overlap each other, the rear shaft support portion of the upper arm and the rear shaft support portion of the lower arm are arranged so as to be displaced from each other, and an axle shaft for coupling a final speed reduction mechanism of the utility vehicle and a vehicle wheel overlaps an arm portion connected to the rear shaft support portion of the lower arm, or the rear shaft support portion of the upper arm and the rear shaft support portion of the lower arm overlap each other, the front shaft support portion of the upper arm and the front shaft support portion of the lower arm are arranged so as to be displaced from each other, and the axle shaft for coupling the final speed reduction mechanism and the vehicle wheel overlaps an arm portion connected to the front shaft support portion of the lower arm;
- a mechanism side connecting portion of the axle shaft is coupled to the final speed reduction mechanism; and
- in a rear view of the utility vehicle or in a front view of the utility vehicle, a part of the mechanism side connecting portion overlaps the front shaft support portion of the upper arm and the rear shaft support portion of the upper arm.

11. The suspension structure according to claim 10, wherein the vehicle wheel is a rear wheel of the utility vehicle.

12. The suspension structure according to claim 10, wherein the vehicle wheel is a front wheel of the utility vehicle.

* * * * *